(12) United States Patent
Pray

(10) Patent No.: US 9,847,725 B2
(45) Date of Patent: Dec. 19, 2017

(54) RELAY DRIVE WITH VOLTAGE ISOLATION

(71) Applicant: Robert Pray, Fort Collins, CO (US)

(72) Inventor: Robert Pray, Fort Collins, CO (US)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/137,225

(22) Filed: Apr. 25, 2016

(65) Prior Publication Data

US 2017/0310222 A1   Oct. 26, 2017

(51) Int. Cl.
*H02M 3/335* (2006.01)
*H02M 1/32* (2007.01)

(52) U.S. Cl.
CPC ......... *H02M 3/33507* (2013.01); *H02M 1/32* (2013.01)

(58) Field of Classification Search
CPC .... H02M 1/32; H02M 3/335; H02M 3/33507; H02M 3/33523; H02M 2005/293; H02M 2005/2935
See application file for complete search history.

(56) References Cited

U.S. PATENT DOCUMENTS

| | | | | |
|---|---|---|---|---|
| 5,796,595 A * | 8/1998 | Cross | .................... | H02M 3/285 363/131 |
| 5,859,524 A * | 1/1999 | Ettes | .................... | H02J 7/0068 320/114 |
| 6,023,155 A * | 2/2000 | Kalinsky | .................. | G05F 1/56 323/274 |
| 6,813,170 B2 * | 11/2004 | Yang | ...................... | H02M 1/32 323/901 |
| 2011/0051463 A1 * | 3/2011 | Chen | ................. | H02M 3/33507 363/19 |
| 2012/0155123 A1 * | 6/2012 | Tang | ................. | H02M 3/33523 363/21.15 |
| 2014/0092648 A1 * | 4/2014 | Tang | ................. | H02M 3/33515 363/21.17 |

* cited by examiner

*Primary Examiner* — Matthew Nguyen
(74) *Attorney, Agent, or Firm* — Bryan Peckjian; SKF USA Inc.

(57) ABSTRACT

Disclosed herein is a flyback system. The flyback system includes a tank circuit comprising a primary side and a secondary side. The flyback system also includes a switching device configured to pulse energy to the tank circuit. The energy is stored in a first side of the tank circuit when the switching device is on. The energy is transferred from the primary side to the secondary side when the switching device is off.

9 Claims, 2 Drawing Sheets

RELAY DRIVE WITH VOLTAGE ISOLATION

BACKGROUND

In general, a relay driver is a circuit that operates a relay so that the relay can function appropriately in a second circuit. For example, the relay based on relay driver operations can be a switch in the second circuit. A problem exists where contemporary vacuum relays do not have a needed standoff voltage from contact to chassis or coil. Thus, any breakdown to a case of the contemporary vacuum relays can arc to coil contacts due to a small clearance distance. In turn, an isolated case and an isolation power supply are utilized because any internal voltage breakdown will not affect or damage extra-low voltage (ELV, which protects against electrical shocks) circuits or put a user in jeopardy.

The contemporary high voltage relays use large open frame high voltage contacts to isolate voltages and switch high voltage outputs. These contactors require a large amount of voltage and power (e.g., 115 Vac or 220 Vac) to drive them. The contactors are also susceptible to oxidation or arcing to nearby objects, along with being affected by altitude and humidity.

SUMMARY

Disclosed herein is a flyback system. The flyback system includes a tank circuit comprising a primary side and a secondary side. The flyback system also includes a switching device configured to pulse energy to the tank circuit. The energy is stored in a primary side of the tank circuit when the switching device is on. The energy is transferred from the primary side to the secondary side when the switching device is off.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter described herein is particularly pointed out and distinctly claimed in the claims at the conclusion of the specification. The foregoing and other features, and advantages of the embodiments herein are apparent from the following detailed description taken in conjunction with the accompanying drawings in which:

DETAILED DESCRIPTION

Embodiments described herein relate to a relay drive with voltage isolation. The relay drive can include a flyback power supply design tuned for a specific relay coil resistance to allow for a voltage isolation using an isolation transformer, thereby not requiring the use of large isolation feedback techniques and having a high efficiency to minimize excess power.

In a regulated embodiment, a circuit design can utilize two separate legs of a core, where the two separate legs are close together and potted. A power supply of the circuit design can't regulate an output of the two separate legs without feedback. In turn, a load and a resistance (e.g., a relay coil) have to be detected to set the voltage for the circuit design. Further, a tuning capacitor on a primary side of the circuit design enables a regulation of the output to a selected voltage (e.g., to select the 24 Vdc to 26 Vdc conversion).

Figure 1:
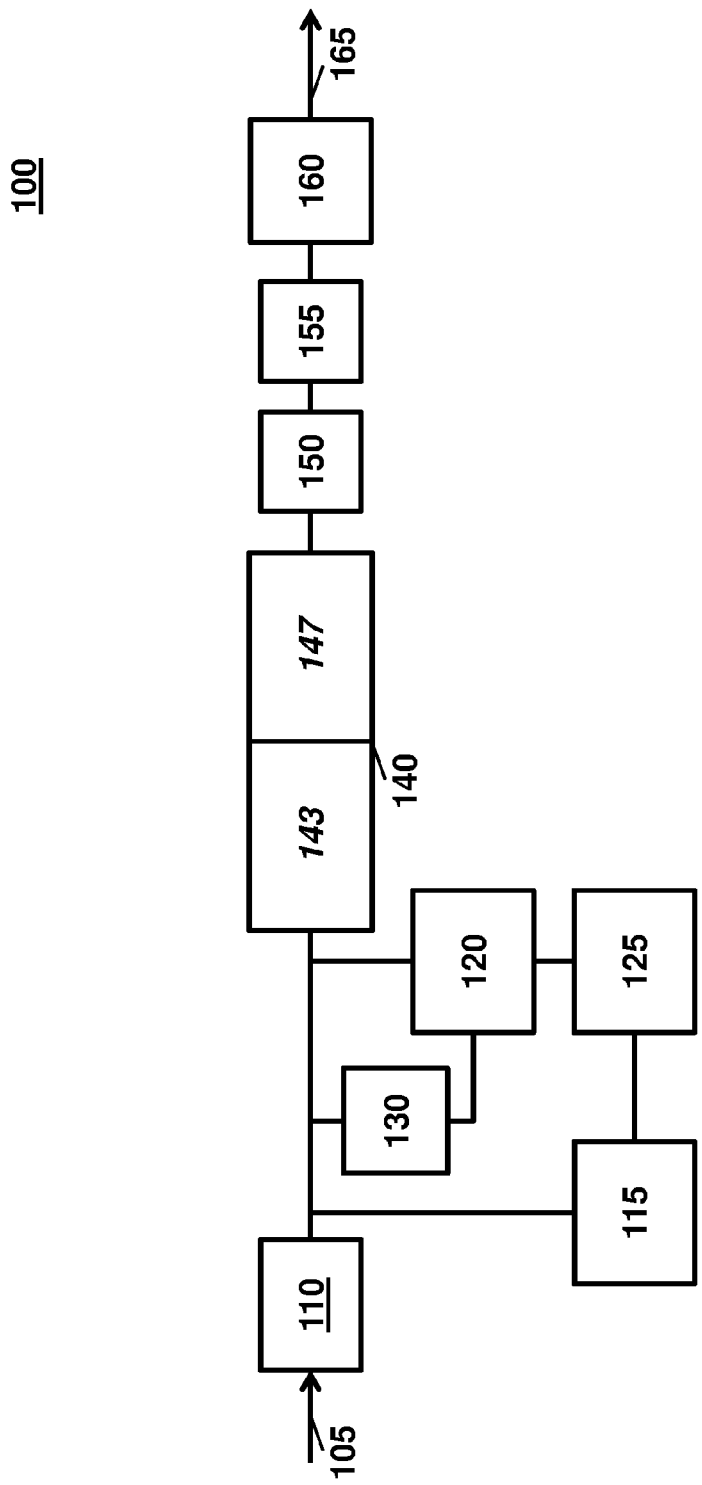
FIG. 1 is a schematic of a flyback design according to an embodiment.

In an unregulated embodiment, a primary side of a flyback design does not utilize feedback and is permitted to go to full pulse width (e.g., to drive a tank circuit). In turn, a leakage or leakage inductance of a transformer obtains a lower parallel capacitance (e.g., even with 2 to 5 watts of power going through the flyback design 100). Turning now to FIG. 1, a flyback design 100 is generally shown in accordance with an embodiment.

An input 105 of the flyback design 100 receives a voltage from a power supply (not shown) that is fed to a first capacitance circuit 110. A flyback integrated circuit 115 is connected to the first capacitance circuit 110 and is configured to output a square wave. The flyback design 100 also includes a switching device 120 and an over current protection circuit 125 to account for an electrical short on an output (e.g., to prevent burning up the switching device 120). The switching device 120 can be configured to turn on and off at a 50% duty cycle, which pulses a capacitor 130 and a tank circuit 140. The tank circuit 140 includes a transformer with a primary side 143 and a secondary side 147. By pulsing, energy is being stored in the primary side 143 of the transformer.

When the switching device 120 turns off, the energy stored in the primary side 143 of the transformer is transferred to the secondary side 147 of the transformer while the tank circuit 140 is ringing. The energy is then rectified and filter (e.g., passed through a rectifier 150 and filter 155) and released as an output 165. The shunt regulator 160 can be configured to open up while the flyback design 100 is running normally. For example, the shunt regulator 160 can also be configured to set to 28 volts to clamp the voltage of flyback design 100 if the output 165 is at a higher impedance then what the flyback design 100 can tolerate.

Figure 2:
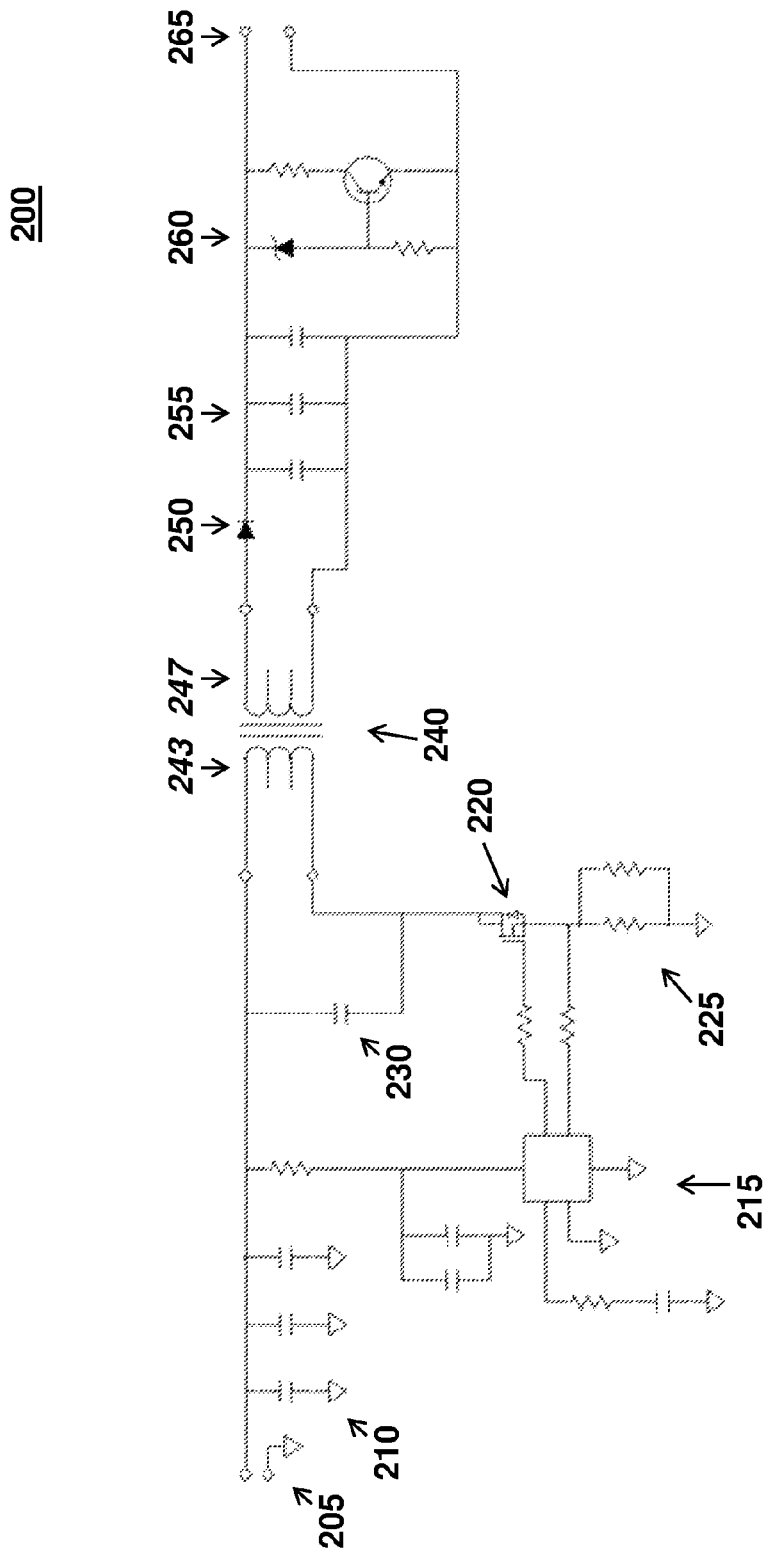
FIG. 2 is another schematic of a flyback design according to an embodiment.

In an embodiment, a relay drive can be a 24 Vdc-26 Vdc relay drive with 40 KV isolation. The 24 Vdc-26 Vdc relay drive with 40 KV isolation includes a 24 Vdc to 26 Vdc 20 Watt flyback power supply design that is tuned for a specific relay coil resistance to allow for a 40 KV isolation (between an input and output) using an isolation transformer and not requiring the use of large isolation feedback techniques. The 24 Vdc to 26 Vdc 20 Watt flyback power supply design also has a greater than 88% efficiency to minimize excess power requirements for the 24V source power supply. Turning now to FIG. 2, a flyback design 200 is generally shown in accordance with an embodiment.

The flyback design 200 includes an input 205, a first capacitance circuit 210, a flyback integrated circuit 215, a switching device 220, an over current protection circuit 225, a capacitor 230, a tank circuit 240 that includes a transformer with a primary side 243 and a secondary side 247, a rectifier 250, a filter 255, a shunt regulator 260, and an output 265.

The flyback design 200 can utilize a custom 1:1.25 ratio potted isolation transformer with the transformer primary (e.g., first side 243, which primary to secondary leakage inductance) in parallel with a properly sized capacitor (e.g., capacitor 230), used as a resonant tank, to maximize the energy transferred to the output 265. If a different resistance coil is used, then the capacitor 230 is adjusted to set an output voltage. The shunt regulator 260 is added to an output section to protect the output 265 from an overvoltage condition (e.g., if a coil should open or a lead is disconnected).

In an embodiment, a primary to a secondary can be utilized to minimize setting up a high frequency capacitor divider to maximize the isolation properties of the assembly with a lower capacitance transformer. To obtain the low capacitance, the leakage inductance can be increased to prevent a typical feedback winding from operating correctly; therefore the flyback circuit is operated at a maximum pulse width. Note that the primary parallel capacitor maximizes the power transfer to the output and setting the output voltage for a given load resistance.

Technical effects and benefits of using embodiments of the flyback design include, but are not limited to, simplifying a design complexity, minimizing a part count, not requiring the use of large isolation feedback techniques, and having a high efficiency to minimize excess power.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A flyback system, comprising:
   a tank circuit comprising a primary side and a secondary side; and
   a switching device configured to pulse energy to the tank circuit,
   wherein the energy is stored in a primary side of the tank circuit when the switching device is on, and
   wherein the energy is transferred from the primary side to the secondary side when the switching device is off while the tank circuit is ringing,
   wherein the switching device is configured to turn on and off at a 50% duty cycle.

2. The flyback system of claim 1, comprising a first capacitance circuit configured to receive a voltage at an input from a power supply.

3. The flyback system of claim 1, comprising a flyback integrated circuit configured to output a square wave.

4. The flyback system of claim 1, comprising an over current protection circuit configured to manage an electrical short to the switching device.

5. The flyback system of claim 1, comprising a rectifier and filter.

6. The flyback system of claim 1, comprising a shunt regulator configured to open up while the flyback design is running if the flyback system is at a higher impedance then a toleration of the flyback system.

7. The flyback system of claim 6, wherein the shunt regulator is to set to 28 volts.

8. The flyback system of claim 1, wherein the tank circuit comprises a ratio potted isolation transformer with the primary in parallel with a capacitor to maximize the energy transferred to an output.

9. The flyback system of claim 8, wherein flyback system comprises a greater than 88% efficiency to minimize excess power requirements for a power supply.

* * * * *